United States Patent [19]

Hashimoto et al.

[11] Patent Number: 4,964,967

[45] Date of Patent: Oct. 23, 1990

[54] SURFACE ACTIVATED ALLOY ELECTRODES AND PROCESS FOR PREPARING THEM

[75] Inventors: Koji Hashimoto, Izumi; Naokazu Kumagai, Matsudo; Katsuhiko Asami; Asahi Kawashima, both of Sendai, all of Japan

[73] Assignees: Daiki Engineering Co., Ltd., Tokyo; Koji Hashimoto, Miyagi, both of Japan

[21] Appl. No.: 481,718

[22] Filed: Feb. 16, 1990

Related U.S. Application Data

[63] Continuation of Ser. No. 98,387, Sep. 18, 1987, abandoned.

[30] Foreign Application Priority Data

Sep. 22, 1986 [JP] Japan ................. 61-222028

[51] Int. Cl.$^5$ ................. C25B 11/06; C25B 11/08
[52] U.S. Cl. ................. 204/292; 204/293; 428/687; 427/53.1
[58] Field of Search ................. 204/292, 293; 428/687; 427/53.1

[56] References Cited

U.S. PATENT DOCUMENTS

| | | | |
|---|---|---|---|
| 4,253,933 | 3/1981 | Sato | 204/293 |
| 4,339,270 | 7/1982 | Hashimoto | 204/293 |
| 4,544,473 | 10/1985 | Ovshinsky | 204/293 |
| 4,609,442 | 9/1986 | Tenhover | 204/293 |
| 4,702,813 | 10/1987 | Tenhover | 204/293 |
| 4,770,949 | 9/1988 | Hashimoto | 204/293 |

*Primary Examiner*—John F. Niebling
*Assistant Examiner*—Ben C. Hsing
*Attorney, Agent, or Firm*—Larson and Taylor

[57] ABSTRACT

Surface activated surface alloy electrodes and a process for preparing them high in corrosion resistance and activity, comprising a corrosion-resistant metal selected from, or a corrosion-resistant alloy composed of two or more metals selected from titanium, zirconium, niobium and tantalum, or a corrosion-resistant metal selected from, or a corrosion-resistant alloy composed of two or more metals selected from titanium, zirconium, niobium and tantalum clad with a corrosion-resistant metal selected from, or a corrosion-resistant alloy composed of two or more metals selected from titanium, zirconium, niobium and tantalum, or with any other metal or alloy, rolled or non-rolled, being used as a substrate metal or alloy; an alloy consisting of 20 to 67 atomic % of one or more metals selected from titanium, zirconium, niobium and tantalum, 0.01 to 10 atomic % of oine or more platinum group metals of ruthenium, rhodium, palladium, iridium and platinum, and substantially the remaining amount of nickel and/or cobalt, existing on said substrate metal or alloy as a rapidly solidified surface alloy of 150 μm or less thickness containing amorphous phase at least partially; and said surface alloy, being treated to be activated on the surface.

3 Claims, 8 Drawing Sheets

LASER BEAM
COVERING LAYER
SUBSTRATE

SURFACE ACTIVATED ALLOY ELECTRODES AND PROCESS FOR PREPARING THEM

This application is a continuation, of application Ser. No. 07/098,387 filed Sept. 18, 1987 abandoned.

FIELD OF THE INVENTION

The present invention relates to surface activated surface alloy electrodes preferably used as electrodes for electrolysis of various aqueous solutions such as sodium chloride aqueous solution and sulfuric acid aqueous solution, and a process for preparing them.

DESCRIPTION OF THE PRIOR ART

Electrodes formed by covering a corrosion-resistant metal such as titanium with a precious metal or precious metal oxide have been industrially used for electrolysis of sodium chloride aqueous solution. For materials used for the same objective, the present inventors registered patents under Japanese Pat. Nos. 1153531 and 1213069, and filed an application for a Japanese patent under Application No. 83-171162.

Furthermore, two of the present inventors filed an application for a Japanese patent under Application No. 85-123111 on amorphous alloy electrode materials containing nickel, tantalum and a precious metal as absolutely required ingredients, as electrode materials for oxygen evolution. Moreover, the present inventors filed applications for Japanese patents under Application Nos. 85-169764, 85-169765 and 85-169767 on surface activated amorphous alloys composed of nickel precious group metals and one or more metals selected from titanium, zirconium, niobium and tantalum, to be used as electrodes for electrolysis of solutions, and an activation treatment process for the alloys, and also filed an application for a Japanese patent under Application No. 85-169766 on surface activated supersaturated solid solution alloys to be used as electrodes for electrolysis of solutions, and an activation treatment process for the alloys.

On the other hand, two of the present inventors filed an application for a patent under Application No. 81-37898 on a process for preparing a surface covering metal layer by irradiation with a high energy density beam, and later the present inventors filed an application for a Japanese patent under Application No. 84-93901 on a process for preparing a surface covering metal layer as an improved process of said process.

The electrodes formed by covering a corrosion-resistant metal with a precious metal now industrially used are liable to peel, for example, when used as anodes in sea water, and are low in corrosion resistance and short in life disadvantageously. On the other hand, electrodes formed by covering a corrosion-resistant metal with a precious metal oxide also disadvantageously cause the oxide to peel during use for the oxidation of chloride ions, evolving relatively a large amount of oxygen, to lower energy efficiency. Furthermore, a common problem of precious metal covered electrodes and precious metal oxide covered electrodes is the use of an expensive precious metal as the main raw material.

To overcome these problems, the present inventors filed previously an application for a patent on very highly active and low-cost electrode materials obtained by applying activation treatment to amorphous alloys or supersaturated solid solution alloys containing only a small amount of a precious metal, by utilizing the properties of these alloys. To provide practical electrodes made from these special materials with excellent properties is the problem to be solved by the present invention.

SUMMARY OF THE INVENTION

The present invention provides energy-saving highly corrosion-resistant electrode and a process for preparing the electrodes, which consist of rapidly solidified surface alloy containing a low concentration of expensive platinum group metals on a conventional bulk metal, and which have excellent performance as energy saving highly corrosion-resistant electrodes. For example when they are used as anode for electrolysis of various sodium chloride aqueous solutions, they possess selectively high activity for chlorine evolution and low activity for parasitic oxygen evolution.

Usually a solid alloy is in the crystalline state. However, if a specifically composed alloy is solidified from the molten state by any method of prevent the formation of the long range order in atomic arrangement such as rapid solidification, the amorphous structure similar to the liquid structure can be obtained, and such an alloy is called an amorphous alloy. Most amorphous alloys are homogeneous single phase alloys for supersaturated solid solutions. Therefore, they have remarkably high strength compared with conventional practical metals, and also have extraordinarily high corrosion resistance and various unique characteristics depending on the chemical compositions. Even if a chemical composition cannot make the entire amorphous structure, an alloy prepared by rapid solidification is composed of supersaturated solid solutions due to extension of the solubility and has excellent properties similar to those of amorphous alloys.

When a very corrosive aqueous solution such as an aqueous solution containing a strong acid or a high concentration of chloride ion is electrolyzed, the electrodes used must process high corrosion resistance and high electrocatalytic activity for the intended electrocatalytic reaction. The present inventors found in their study to obtain such electrode materials that highly active and highly corrosion-resistant electrode materials for electrolysis can be obtained by applying activation treatment to an amorphous alloy or a supersaturated solid solution alloy with a specific composition containing a small amount of platinum group metals, the activation treatment being effective only for the alloy having the very high homogeneity peculiar to the amorphous alloy supersaturated solid solution alloy, and filed application for Japanese patents under Application Nos. 85-123111, 85-169764, 85-169765, 85-169766 and 85-169767.

If rapid solidification from the molten state is carried out, these amorphous alloys or rapidly solidified supersaturated solid solution alloys are usually about 150 $\mu$m or thinner alloy sheets based on the requirement of rapid solidification. If they are used as electrode for electrolysis of solutions, the thickness limitation as conductors is responsible for a high electric resistance, and hence their utilization is restricted.

On the other hand, the present inventors found that if a metal surface is irradiated with a high energy density beam for a short time for instantaneous melting of a limited volume, the heat of the molten portion is rapidly absorbed by the surrounding solid metal, and subsequently that this phenomenon can be used to prepare a rapidly solidified amorphous surface alloy on the surface of conventional bulk metal, and filed applications for, Japanese patents under Application Nos. 81-37898 and 84-93901.

The present inventors further studied the properties of amorphous alloys and a process for preparing them, and found that an amorphous surface alloy or a supersaturated solid solution alloy for electrodes can be prepared on a corrosion-resistant metal or alloy by said irradiation treatment with a high energy density beam, and that if the activation treatment is applied to the surface alloy, a surface activated surface alloy electrode can be obtained. Thus the present invention has been achieved.

The present invention provides an electrode consisting of a corrosion-resistant substrate metal and a surface activated surface alloy, and a preparation process of surface activated surface alloy electrodes consisting of covering a specified substrate metal with a surface layer by plating or any other method, melting and mixing the surface layer with a part of the substrate metal by high energy density beam irradiation, rapid quenching of the molten surface alloy on the substrate metal by the self-quenching caused by rapid heat absorption from the molten portion by the surrounding solid phase metal, and applying surface activation treatment to the surface alloy.

To provide a metal electrode with selective electrocatalytic activity for any specific electrochemical reaction and high corrosion resistance against the reaction condition, an alloy containing effective elements as much as required must be prepared. However, if various alloying elements are added in large quantities to a crystalline metal prepared by any ordinary method, the structure composed of multiple phases different in chemical properties is often formed. On the contrary, in the present invention, in the surface alloy with amorphous phase at least partially formed by melting and mixing the covering layer and part of the substrate metal, and by subsequent self-quenching, the elements contained in the molten substrate metal part and covering layer are very homogenously distributed forming supersaturated solid solution. Accordingly, the present invention is rapidly solidified, without allowing the localization of component elements, and is a solid phase so highly homogeneous as to partially contain amorphous phase, thus being excellent in corrosion resistance. If the activation treatment is applied to the surface alloy, the electrocatalytically less effective elements are selectively dissolved with a consequent remarkable enrichment of electrocatalytically active platinum group elements in addition to a substantial increase in the effective surface area. Thus, an electrode consisting of a surface activated surface alloy and substrate metal, the latter of which is able to act as the electric conductor, is obtained.

In the present invention, a metal selected from, or an alloy composed of two or more metals selected from titanium, zirconium, niobium and tantalum is used as the substrate metal, and it is covered by plating or any other method with nickel and/or cobalt and one or more metals of ruthenium, rhodium, palladium, iridium and platinum. The surface is then irradiated with a high energy density beam, to melt and mix part of the substrate metal and the covering layer, and subsequent self-quenching makes a predetermined amorphous composition. The main metallic components in the covering layer and their thicknesses are selected to allow the surface alloy to become at least partially amorphous by self-quenching after melting and mixing of the surface layer of 150 μm or less thickness. The substrate metal acts as a conductor to feed current to the electrocatalytically active surface alloy and is selected from the metals having a high corrosion resistance under the electrolytic conditions in strongly corrosive environments in the presence of any strong acid and halogen ions. The corrosion resistance of the surface alloy formed by the melt alloying of the covering layer with a portion of the substrate metal and also owes mostly to the presence of the substrate metal in the surface alloy.

The substrate metal which can be one metal selected from, or an alloy of two or more metals selected from titanium, zirconium, niobium and tantalum can also be selected from various commerical alloys mainly containing these metals, to meet the object of the present invention without any problem, as far as the amount of any metal selected from titanium, zirconium, niobium and tantalum or the total amount of two or more of them is 20 to 67 atom % in the surface alloy. It may also desirable that the covering layer obtained by plating, etc. contains nickel and/or cobalt and any other metal or alloy of molybdenum, tungsten, etc., since such metals and/or alloy may enhance the amorphous-forming ability in the surface alloy or to further enhance the corrosion resistance of the surface alloy produced.

Furthermore, one or more metals of ruthenum, rhodium palladium, iridium and platinum stated in the present invention mainly provide respectively electrocatalytic activity of predetemined reaction and are selected to suit the electrode reactions. They are applied by plating or any other covering treatment, to be contained by 10 atom % or less in the amorphous surface alloy produced. Therefore, the thicknesses of the respective covering layers in the present invention are decided, based on the composition and thickness of the surface alloy to be prepared.

For example, in case even though tantalum is required as the substrate metal to the contained in the amorphous surface alloy, inexpensive titanium can be used as the highly corrosion resistant substrate metal acting as an electric conductor instead of expensive tantalum, it is allowed that titanium is clad with tantalum, rolled as required, to form a tantalum layer as thick as required to be dissolved in the surface alloy, covered as predetermined by plating, etc., and irradiated with a high energy density beam. For an environment which does not require such high corrosion resistance as attained by titanium, a lower priced metal such as iron or copper or an alloy like stainless steel can be used as the conductor, and be clad with titanium, zirconium, niobium, tantalum or any alloy of these metals required to be dissolved into the surface alloy, for use as the substrate metal. Therefore, in the present invention, it is also allowed that a metal or alloy is clad with another metal or alloy, to be used as the substrate for the covering layer applied by plating, etc. Furthermore, it is also allowed that the substrate metal can be covered on both sides by plating, etc., to have a surface alloy on each side.

The covering by plating, etc. does not always assure that the covering layer and the substrate metal achieve such bonding as to form an alloy layer. If insufficient bonding is irradiated with a high energy density beam, the covering layer often peels. In such a case, heat treatment should be applied in vacuo, inert gas or other atmosphere, to alloy the covering layer with part of the substrate or at least to bond tightly the covering layer to the substrate layer, interrupting or after the plating or other covering treatment before irradiation with a high energy density beam. The alloying of part of the substrate metal with the covering layer by such heat treatment lowers the melting point and enhances the absorbability for the high energy density beam, and hence a long time for melting and mixing may become unnecessary. Therefore, it is effective to apply such heat treatment interrupting or after the plating or other covering treatment and before irradiation with a high energy density beam.

DESCRIPTION OF THE PREFERRED EMBODIMENTS

Figure 1:
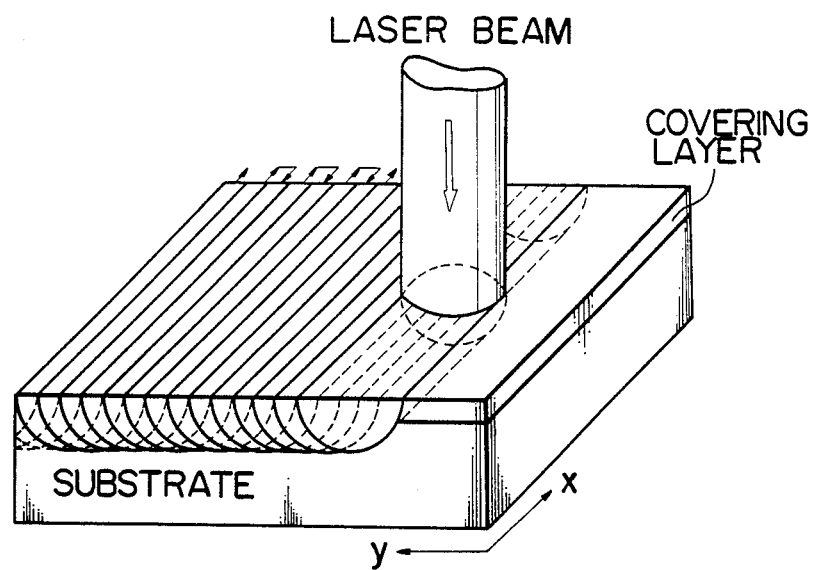
FIG. 1 shows a schematic drawing of laser beam irradiation treatment as an example of the method for preparing the amorphous surface alloy by the high energy density beam irradiation treatment of the present invention.

In FIG. 1, a sample to be irradiated is fixed on an X-Y table, and is reciprocated in X direction during laser beam irradiation, while the sample is moved in Y direction by a predetermined distance after completion of each one-way motion in X direction. In this manner, the entire surface is treated by irradiation with a laser beam, and the heat of the molten portion is mainly absorbed by the under lying solid phase, to cause rapid quenching.

The control of irradiation energy density and irradiation time of the high energy density beam decides the extent to which the substrate metal is dissolved into the surface alloy, and therefore decides the composition of the surface alloy produced and assures rapid quenching. If the molten portion becomes so deep as to excessively dissolve the substrate metal, the composition of the molten portion deviates from the condition to form amorphous phase by quenching. Furthermore, if excessive heat input is made for melting excessive heating of the solid metal around the molten portion prevents rapid quenching of the molten portion after melting, and a portion of the amorphous phase formed is crystallized. Therefore, in the irradiation with a high energy density beam, the thickness of the molten portion should be kept at 150 $\mu$m which allows rapid quenching for forming amorphous phase. Furthermore, to assure rapid quenching, the irradiation energy density and irradiation time of the high energy density beam to each portion must be controlled to be 5000 joules/cm$^2$ or less and $5\times10^{-3}$ second or less respectively. If the entire surface alloy, instead of part, is to be vitrified, the product of the irradiation energy density and the irradiation time must be 5 joule-second/cm$^2$ or less, but this restriction is not required for the preparation of a surface alloy partially containing amorphous phase.

If an irradiation treatment of high energy density beam is insufficient to mix the covering layer and part of the substrate metal to form homogeneous amorphous phase by rapid quenching, the high energy density beam irradiation should be repeated several times, for sufficient alloying and mixing. If sufficient mixing is not achieved, the melting point is generally high, and the mixture is mostly hard to absorb the high energy density beam. In such a case, if the high energy density beam is applied several times, to sufficiently mix and alloy the molten layer of 150 $\mu$m or less in thickness, by enhancing the irradiation energy density and extending the irradiation time, the subsequent irradiation with a high energy density beam for a short time can change part of the surface alloy into a composition to allow amorphous phase formation. Sufficient mixing generally lowers the melting point, to allow easy absorption of the high energy density beam, and if a beam of low energy density is subsequently applied for a short time, part of the surface alloy can be vitrified. If the melting point of the substrate metal or alloy is remarkably higher than the melting point of the covering metal, the covering metal of lower melting point is evaporated during melt homogenization of the covering layer and the substrate, and therefore, extra covering is required to make up for the evaporation loss, by estimating the evaporation loss beforehand.

The surface alloy prepared on the substrate metal contains a small amount of homogeneously distributed electrocatalytically active platinum group metals, but is not always provided with sufficiently high electrocatalytic acitivity. However, if such a surface alloy is immersed in a corrosive solution of hydrofluoric acid, etc., hydrogen is actively generated on platinum group elements such as ruthenium, rhodium, palladium, iridium and platinum homogeneously distributed in the surface alloy, and as a result, cobalt, nickel, titanium, zirconium, niobium and tantalum less noble than the platinum group elements are selectively dissolved with a consequent remarkable enrichment of the platinum group elements on the surface of the surface alloy, in addition to an increase in the effective surface area due to substantial surface roughing by which the surface turns black. Accordingly the surface activation treatment is completed when the surface of the surface alloy becomes blakish. On the contrary, crystalline alloys prepared by conventional process are composed of heterozeneous multiple phases, even if the average compositions of the surface alloys are the same as those of the present invention, and therefore, even if they are immersed in a corrosive hydrofluoric acid, etc., hydrogen evolution and selective dissolution of electrocatalytically less effective alloying elements other than platinum group elements hardly occur. Therefore, the activation treatment which consists of selective dissolution of electro-catalytically less effective alloy constituents such as cobalt, nickel and elements dissolved from the substrate into the surface alloy with a consequent remarkable enrichment of electrocatalytically active platinum group metals in addition to a substantial increase in effective surface area due to surface roughing, can be applied only the rapidly solidified alloys of the present invention.

In this way, the surface activated surface alloy electrodes with high corrosion resistance and high electrocatalytic activity can be obtained. FIGS. 2 to 16 show polarization curves of surface alloys of the present invention.

EXAMPLE 1

A 1 mm thick niobium sheet was plated with nickel, palladium and rhodium respectively by 19 $\mu$m, 1 $\mu$m and 0.5 $\mu$m in thickness, and the plated sheet was heat-treated under vacuum and then quenched in a diffusion pump oil in vacuo. This treatment led to diffusion of niobium into the plating layers and to the formation of tight bonding among three plating layers, and the niobium substrate.

The sample was fixed on an X-Y table reciprocating in X direction and was irradiated with a continuous $CO_2$ laser beam of 500 W in output and 200 μm in beam diameter. The irradiation energy density was 3125 $J/cm^2$, and the melting time was $2.5 \times 10^{-3}$ sec. After completion of one-way motion in X direction, the sample moved in Y direction by 50 μm for overlapped laser irradiation to convert the entire surface to the laser-treated surface. The treatment was repeated once again under the same condition, to obtain a surface alloy consisting of nickel, niobium, palladium and rhodium homogeneously distributed mixture of crystalline and amorphous phases. The third irradiation treatment was performed by moving the sample in Y direction by 75 μm after each one-way motion in X direction at an irradiation energy desity of 781.25 $J/cm^2$ for a melting time of $6.25 \times 10^{-4}$ sec. The third treatment produced an amorphous surface alloy layer consisting of nickel, niobium, palladium and rhodium on the niobium substrate.

A partial section of the sample was cut out, and polished using silicon carbide paper and buff, to measure the average thickness of the amorphous surface alloy layer using an optical microscope and a scanning electron microscope. The average thickness was found to be 40 μm Calculation made from the average thickness on the assumption that nickel, palladium and rhodium were not evaporated during the laser beam irradiation treatment revealed that the amorphous surface alloy consisted of Ni-37 atom % Nb-2 atom % Pd-1 atom % Rh. The values coincided with the results obtained by analyzing the amorphous surface alloy using an X-ray microanalyzer.

Figure 2:
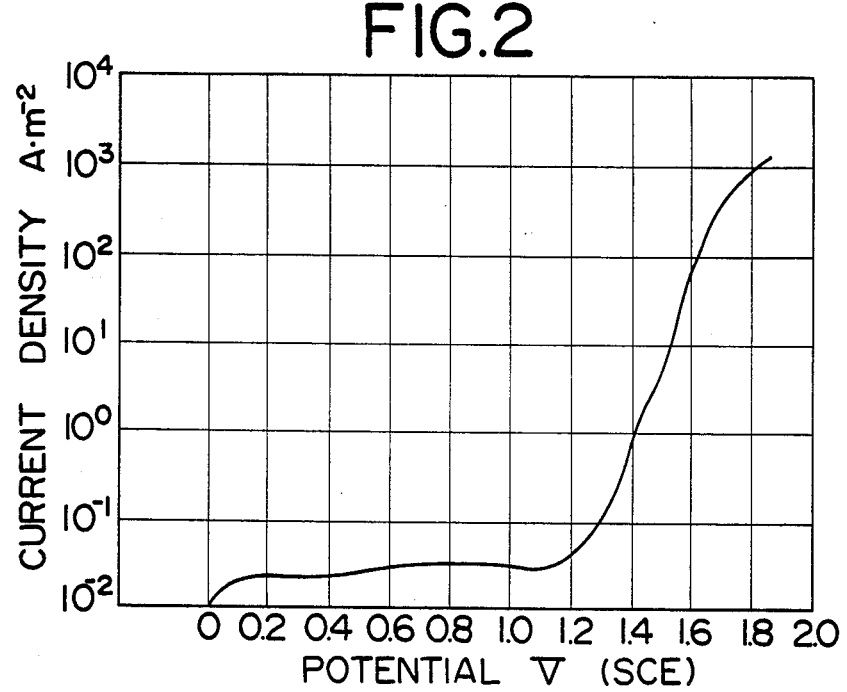
FIGS. 2–16 show polarization curves of surface alloys of the present invention.
Figure 3:
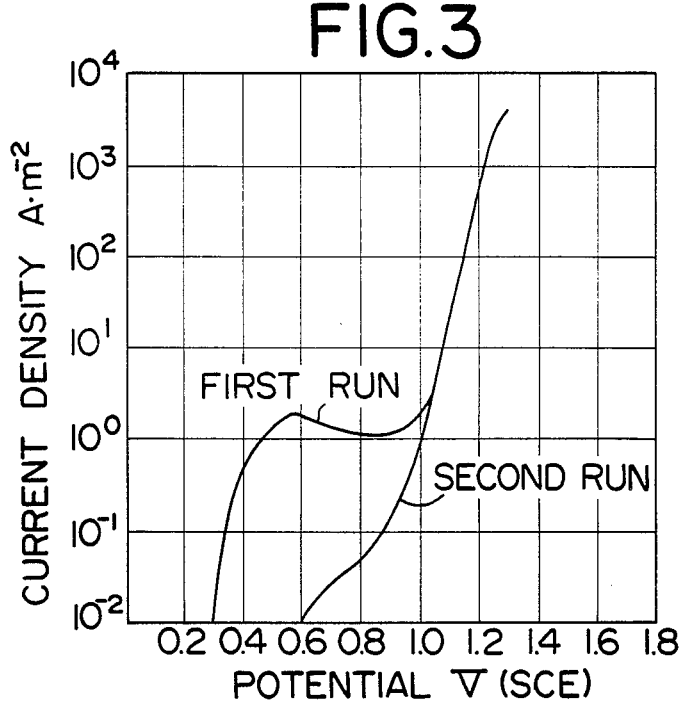

The amorphous surface alloy produced by laser irradiation was used to obtain the anodic polarization curve in 0.5N NaCl solution at 30° C., and the curve is shown in FIG. 2. The amorphous surface alloy had been spontaneously passivated, without showing any active state, and was passive over a wide range, indicating a very high corrosion resistance. At high potentials, the current density rose due to chlorine evolution. For further enhancing the electrocatalytic activity for chlorine evolution, the surface activation treatment was carried out by immersion in 46% HF solution at room temperature for 90 seconds, until the surface turned to black due to surface roughening. The anodic polarization curve obtained in 0.5N NaCl solution at 30° C. is shown in FIG. 3. The polarization curve after the surface activation treatment shows the maximum dissolving current at about 0.6 V (SCE). This is active dissolution current of elements remaining undissolved in the surface layer during the surface activation treatment. However, once polarization was performed at 1.0 V (SCE) or higher potentials, the second run of polarization measurement shows no active dissolution current indicating a high corrosion resistance due to spontaneous passivation. In the high potential region, the current based on chlorine evolution sharply rose. For example, the current density at 1.2 V (SCE) reached 15,000 times that before surface activation treatment, and hence the electrocatalytic activity was increased to 15,000 times by the surface activation treatment.

From the above results, it can be seen that a surface activated surface alloy with combining both high corrosion resistance and high electrocatalytic activity could be formed on a crystalline bulk metal.

EXAMPLE 2

A 1 mm thick tantalum sheet was plated with nickel, palladium and rhodium respectively by 9 μm, 0.42 μm and 0.2 μm in thickness, and the plated sheet was heat-treated under vacuum and then quenched in a diffusion pump oil in vacuo. This treatment led to diffusion of tantalum into the plating layers and to the formation of tight bonding among three plating layers and the tantalum substrate.

The sample was fixed on an X-Y table reciprocating in X direction was irradiated with a continuous $CO_2$ laser beam of 500 W in output and 200 μm in beam diameter. The irradiation energy density was 3125 $J/cm^2$, and the melting time was $2.5 \times 10^{-3}$ sec. After completion of each one-way motion in X direction, the sample was moved in Y direction by 50 μm for overlapped laser irradiation to convert the entire surface to laser-treatment surface. The treatment was repeated twice under the same condition, to obtain a surface alloy with nickel, tantalum, palladium and rhodium homogeneously distributed mixture of crystalline and amorphous phase mixed. The fourth irradiation treatment was performed by moving the sample in Y direction by 75 μm after each one-way motion in X direction at an irradiation energy density of 781.25 $J/cm^2$ for a melting time of $6.25 \times 10^{-4}$ sec. The fourth treatment produced an amorphous surface alloy layer consisting of nickel, tantalum, palladium and rhodium on the tantalum substrate.

A partial section of the sample was cut out, and polished using silicon carbide paper and buff, to measure the average thickness of the amorphous surface alloy layer using an optical microscope and a scanning electron microscope. The average thickness was found to be about 16 μm. Calculation made from the average thickness on the assumption that nickel, palladium and rhodium were not evaporated during the laser beam irradiation treatment revealed that the amorphous surface alloy consisted of Ni-29.3 atom % Ta-2.3 atom % Pd-1.2 atom % Rh. The values coincided with the results obtained by analyzing the amorphous surface alloy using an X-ray microanalyzer.

Figure 4:
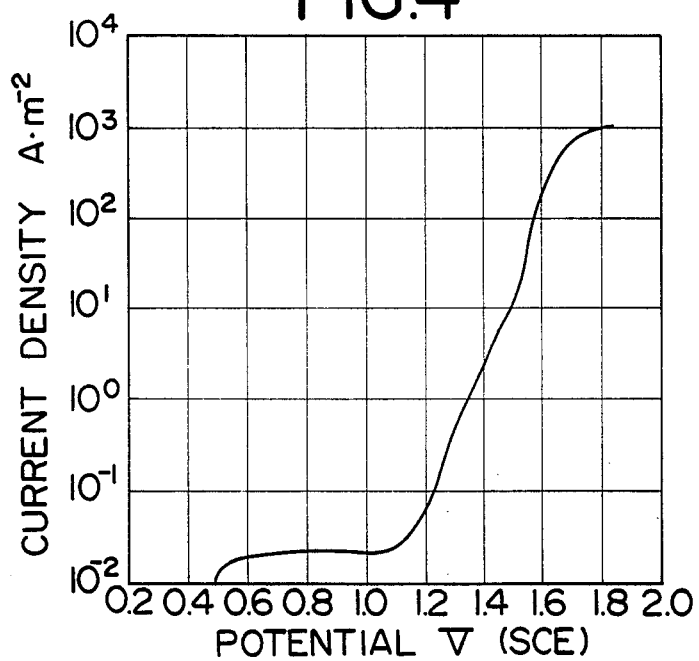

The amorphous surface alloy produced by laser irradiation was used to obtain the anodic polarization curve in 0.5N NaCl solution at 30° C., and the curve is shown in FIG. 4. The amorphous surface alloy had been spontaneously passivated, without showing any active state at all, and was passive over a wide range, indicating very high corrosion resistance. At high potentials, the current density rose due to chlorine evolution.

Figure 5:
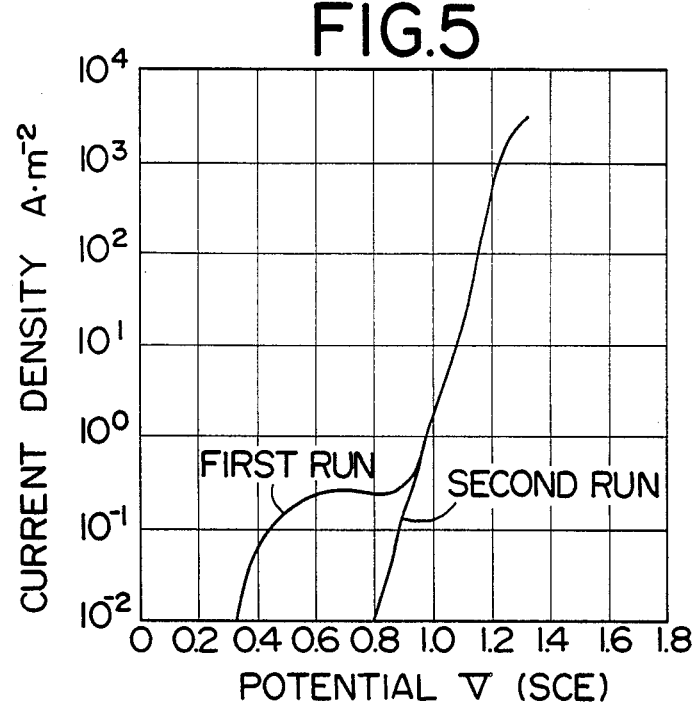

For further enhancement of the electrocatalytic activity for chlorine evolution, the surface activation treatment was carried out by immersion in 46% HF solution at room temperature for 90 seconds, until the surface turned to black due to surface roughening. The anodic polarization curve obtained in 0.5N Nacl solution at 30° C. is shown in FIG. 5. The polarization curve after the surface activation treatment shows the maximum dissolving current at about 0.6 V (SCE). This is the active dissolution current of the elements remaining undissolved in the surface layer during the surface activation treatment. However, once polarization was made at 1.0 V (SCE) or higher potentials, the second run of polarization measurement shows no active dissolution current indicating a high corrosion resistance due to spontaneously passivation. In the high potential region, the current based on chlorine evolution sharply rose. For example, the current density at 1.2 V (SCE) reached 15,000 times that before surface activation treatment, and hence the electrocatalytic activity was increased to 15,000 times by the surface activation treatment.

From the above results, it can be seen that a surface activated surface alloy combining both high corrosion resistance and high electrocatalytic activity could be formed on a crystalline bulk metal.

EXAMPLE 3

A 1 mm thick titanium sheet was plated with nickel, palladium and rhodium respectively by 18 $\mu$m, 1 $\mu$m and 0.5 $\mu$m in thickness, and plated sheet was heat-treated under vacuum and then quenched in a diffusion pump oil in vacuo. This treatment led to diffusion of titanium into the plating layer and to the formation of tight bonding among the three plating layers and the titanium substrate. The sample was fixed on an X-Y table reciprocating in X direction and was irradiation with a continuous $CO_2$ laser beam of 500 W in output and 200 $\mu$m in beam diameter. The irradiation energy density was 781.25 $J/cm^2$, and the melting time was $6.25 \times 10^{-4}$ sec. After completion of each one-way motion in X direction, the sample was moved in Y direction by 25 $\mu$m for overlapped laser irradiation to convert the entire surface to the laser-treated surface. The treatment made under said condition provided a surface alloy with nickel-, titanium-, palladium- and rhodium-homogeneously distributed mixture of crystalline and amorphous phases. The second irradiation treatment was performed by moving the sample in Y direction by 75 $\mu$m after each one-way motion in X direction at an irradiation energy density of 480.8 $J/cm^2$ for a melting time was $3.85 \times 10^{-4}$ sec. The second treatment produced a surface alloy layer partially containing amorphous phase and consisting of nickel, titanium, palladium and rhodium on the titanium substrate. A partial section of the sample was cut out, and polished using silicon carbide paper and buff, to measure the average thickness of the surface alloy layer, using an optical microscope and a scanning electron microscope. The average thickness was found to be 72 $\mu$m. Calculation made from the average thickness on the assumption that nickel, palladium and rhodium were not evaporated during the laser beam irradiation treatment revealed that the amorphous surface alloy consisted of Ni-63.2 atom % Ti-1.4 atom % Pd-0.8 atom % Rh. The values coincided with the results obtained by analyzing the surface alloy using an X-ray microanalyzer.

Figure 6:
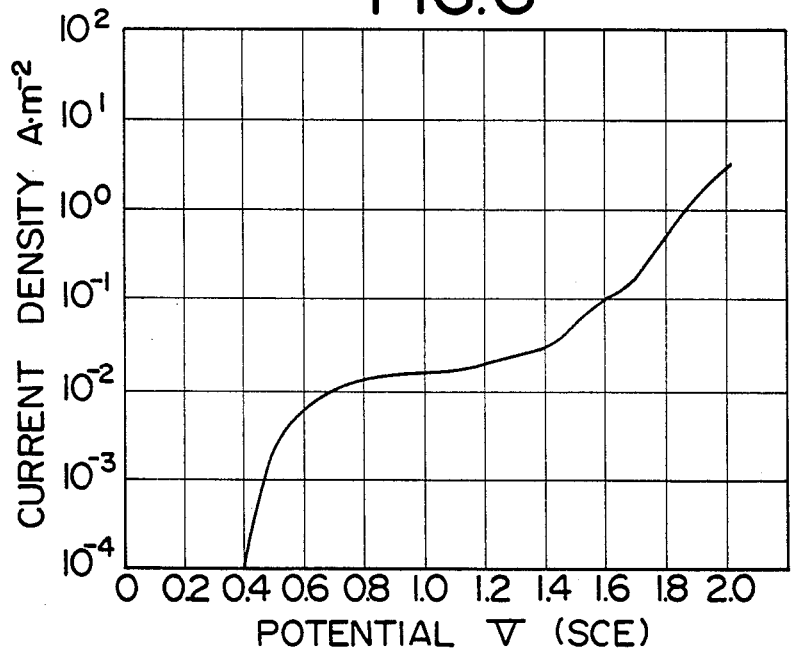

The surface alloy produced by laser irradiation was used to obtain the anode polarization curve in 0.5N NaCl solution at 30° C., and the curve is shown in FIG. 6. The surface alloy had been spontaneously passivated, without showing any active state, and was passive over a wide range, indicating a very high corrosion resistance. At high potentials, the current density rose due to chlorine evolution.

For further enhancement of the electrocatalytic activity for chlorine evolution, the surface activation treatment was carried out by immersion in 4.6% HF solution at room temperature for 90 seconds, until the surface turned to black due to surface roughening. The anodic polarization curve obtained in 0.5% NaCl solution at 30° C. was almost the same as that in Example 1, indicating that the surface alloy was highly active as an electrode.

From the above results, it can be seen that a surface activated surface alloy combining both high corrosion resistance and high electrocatalytic activity could be formed on a crystalline bulk metal.

EXAMPLE 4

A 1 mm thick niobium-titanium alloy sheet containing 12.5 atom % of titanium was plated with nickel, palladium and rhodium respectively by 8 $\mu$m, 0.42 $\mu$m and 0.2 $\mu$m in thickness, and plated sheet was heat-treated under vacuum and then quenched in a diffusion pump oil in vacuo. This treatment led to diffusion of elements from the alloy substrate into the plating layer and to the formation of tight bonding among the three plating layers and the alloy substrate. The sample was fixed on an X-Y table reciprocating in X direction and was irradiation with a continuous $CO_2$ laser beam of 500 W in output and 200 $\mu$m in beam diameter.

The irradiation energy density was 961.54 $J/cm^2$, and the melting time was $7.69 \times 10^{-4}$ sec. After completion of each one-way motion in X direction, the sample was moved in Y direction by 25 $\mu$m for overlapped laser irradiation to convert the entire surface to the laser-treated surface. The treatment made under said condition provided a surface alloy with nickel-, titanium-, palladium- and rhodium-homogeneously distributed mixture of crystalline and amorphous phases. The second irradiation treatment was performed by moving the sample in Y direction by 75 $\mu$m after each one-way motion in X direction at an irradiation energy density of 781.25 $J/cm^2$ for a melting time was $6.25 \times 10^{-4}$ sec. The second treatment produced an amorphous alloy layer consisting of nickel, niobium, titanium, palladium and rhodium on the niobium-titanium alloy substrate.

A partial section of the sample was cut out, and polished using silicon carbide paper and buff, to measure the average thickness of the amorphous surface alloy layer using an optical microscope and a scanning electron microscope. The average thickness was found to be 17 $\mu$m Calculation made from the average thickness on the assumption that nickel, palladium and rhodium were not evaporated during the laser beam irradiation treatment revealed that the amorphous surface alloy consisted of Ni-32.6 atom % Nb-4.6 atom % Ti-2.3 atom % Pd-1.2 atom-% Rh. The values coincided with the results obtained by analyzing the amorphous surface alloy using X-ray microanalyzer.

Figure 7:
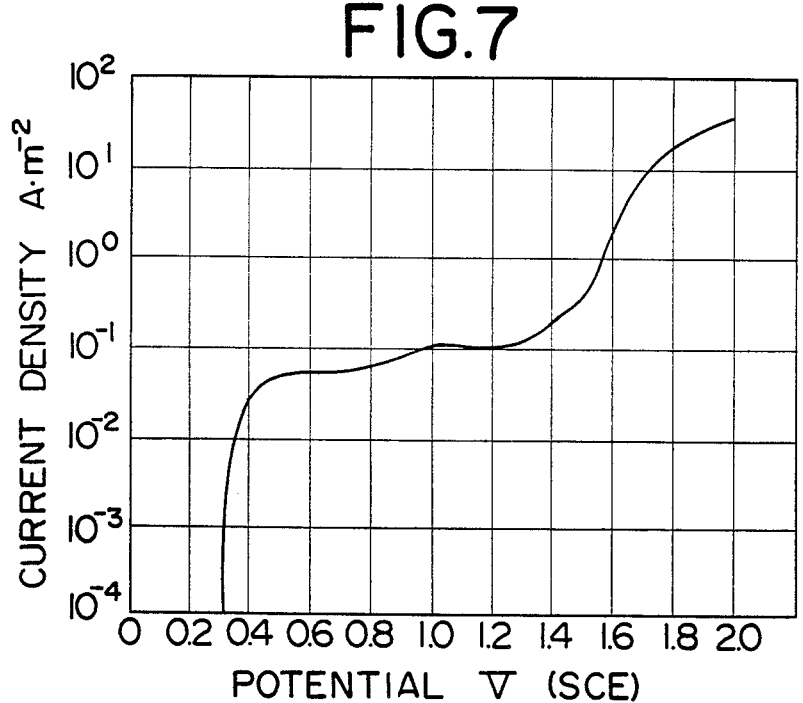

The surface alloy produced by laser irradiation was used to obtain the anode polarization curve in 0.5N NaCl solution at 30° C. and the curve is shown in FIG. 7. The surface alloy had been spontaneously passivated, without showing any active state, and was passive over a wide range, indicating very high corrosion resistance. At high potentials, the current density rose due to chlorine evolution.

For further enhancement of the electrocatalytic activity for chlorine evolution, the surface activation treatment was carried out by immersion in 4.6% HF solution at room temperature for 90 seconds, until the surface turned to black due to surface roughening. The anodic polarization curve obtained in 0.5N NaCl solution at 30° C. was almost the same as that in Example 1, indicating that the surface alloy was highly active as an electrode.

From the above results, it can be seen that a surface activated surface alloy combining both high corrosion resistance and high electrocatalytic activity could be formed on a crystalline bulk alloy.

EXAMPLE 5

A 1 mm thick titanium-niobium alloy sheet containing 12.5 at. % of niobium was plated with nickel, palladium and rhodium respectively by 8 $\mu$m, 0.42 $\mu$m and 0.2 $\mu$m in thickness, and plated sheet was heat-treated under vacuum and then quenced in a diffusion pump oil in vacuo. This treatment led to diffusion of elements from the alloy substrate into the plating layer and to the formation of tight bonding among the three plating layers and the alloy substrate. The sample was fixed on an X-Y table reciprocating in X direction and was irradiation with a continuous $CO_2$ laser beam of 500 W in output and 200 $\mu$m in beam diameter. The irradiation energy density was 731.25 J/cm$^2$, and the melting time was $6.25 \times 10^{-4}$ sec. After completion of each one-way motion in X direction, the sample was moved in Y direction by 50 $\mu$m for overlapped laser irradiation to convert the entire surface to the laser-treated surface. The treatment was repeated once again, to obtain a surface alloy with nickel-, titanium-, niobium-, palladium- and rhodium-homogeneously distributed mixture of crystalline and amorphous phases. The third irradiation treatment was made by moving the sample in Y direction by 75 $\mu$m after each one-way motion in X direction at an irradiation energy density of 731.25 J/cm$^2$ for a melting time was $6.25 \times 10^{-4}$ sec. The third treatment produced a surface alloy layer partially containing amorphous phase and consisting of nickel, niobium, palladium and rhodium on the titanium-niobium alloy substrate.

A partial section of the sample was cut out, and polished using silicon carbide paper and buff, to measure the average thickness of the surface alloy layer using an optical microscope and a scanning electron microscope. The average thickness was found to be 30 $\mu$m. Calculation made from the average thickness on the assumption that nickel, palladium and rhodium were not evaporated during the laser beam irradiation treatment revealed that the surface layer consisted of Ni-53.5 atom % Ti-7.5 atom % Nb-4 atom % Pd-0.7 atom % Rh. The values coincided with the results obtained by analyzing the surface alloy using an X-ray microanalyzer.

Figure 8:
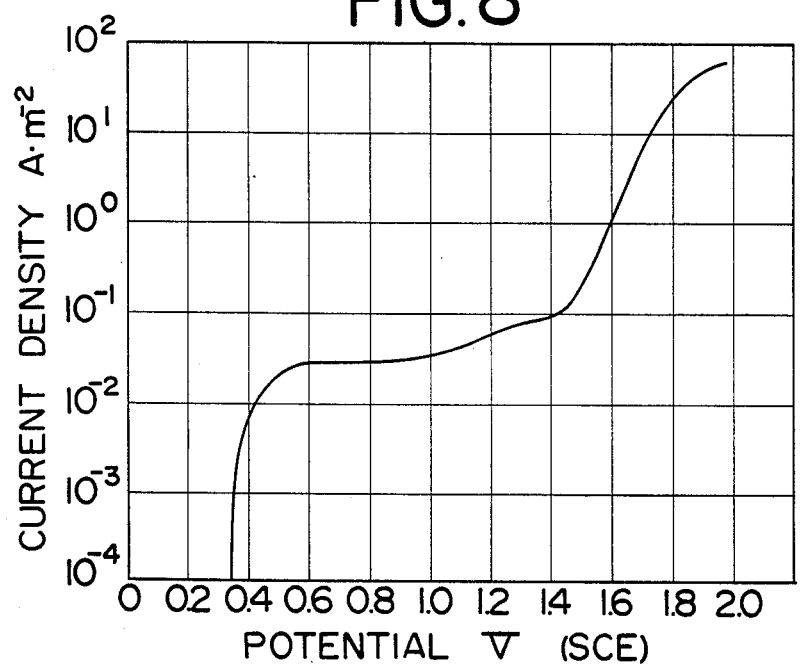

The surface alloy produced by laser irradiation was used to obtain the anode polarization curve in 0.5N NaCl solution at 30° C., and the curve is shown in FIG. 8. The surface alloy had been spontaneously passivated, without showing any active state at all, and was passive over a wide range, indicating a very high corrosion resistance. At high potentials, the current density rose due to chlorine evolution.

For further enhancement of the electrocatalytic activity for chlorine evolution, the surface activation treatment was carried out by immersion in 4.6% HF solution at room temperature for 90 seconds, until the surface turned to black due to surface roughening. The anodic polarization curve obtained in 0.5N NaCl solution at 30° C. was almost the same as that in Example 1, indicating that the surface alloy was highly active as an electrode.

From the above results, it can be seen that a surface activated surface alloy combining both high corrosion resistance and high electrocatalytic activity could be formed on a crystalline bulk alloy.

EXAMPLE 6

A 1 mm thick titanium-tantalum alloy sheet containing 8 wt. % of niobium was plated with nickel, palladium and rhodium respectively by 8 $\mu$m, 1 $\mu$m and 0.47 $\mu$m in thickness, and plated sheet was heat-treated under vacuum and then quenced in a diffusion pump oil in vacuo. This treatment led to diffusion of elements from the alloy substrate into the plating layer and to the formation of tight bonding among the three plating layers and the alloy substrate. The sample was fixed on an X-Y table reciprocating in X direction and was irradiation with a continuous $CO_2$ laser beam of 500 W in output and 200 $\mu$m in beam diameter. The irradiation energy density was 781.25 J/cm$^2$, and the melting time was $6.25 \times 10^{-4}$ sec. After completion of each one-way motion in X direction, the sample was moved in Y direction by 25 $\mu$m for overlapped laser irradiation to convert the entire surface to the laser-treated surface. The treatment under said condition provided a surface alloy with nickel-, titanium-, tantalum-, palladium- and rhodium-homogeneously distributed mixture of crystalline and amorphous phases. The second irradiation treatment was made by moving the sample in Y direction by 100 $\mu$m after each one-way motion in X direction at an irradiation energy density of 480.8 J/cm$^2$ for a melting time was $3.85 \times 10^{-4}$ sec.

The second treatment produced a surface alloy layer partially containing amorphous phase annd consisting of nickel, titanium, tantalum, palladium and rhodium on the titanium-tantalum alloy substrate.

A partial section of the sample was cut out, and polished using silicon carbide paper and buff, to measure the average thickness of the surface alloy using an optical microscope and a scanning electron microscope. The average thickness was found to be 35 $\mu$m. Calculation made from the average thickness on the assumption that nickel, palladium and rhodium were not evaporated during the laser beam irradiation treatment revealed that the surface alloy consisted of Ni-59.4 atom % Ti-5.3 atom % Ta-2.9 atom % Pd-1.5 atom % Rh. The values coincided with the results obtained by analyzing the surface alloy using an X-ray microanalyzer.

Figure 9:
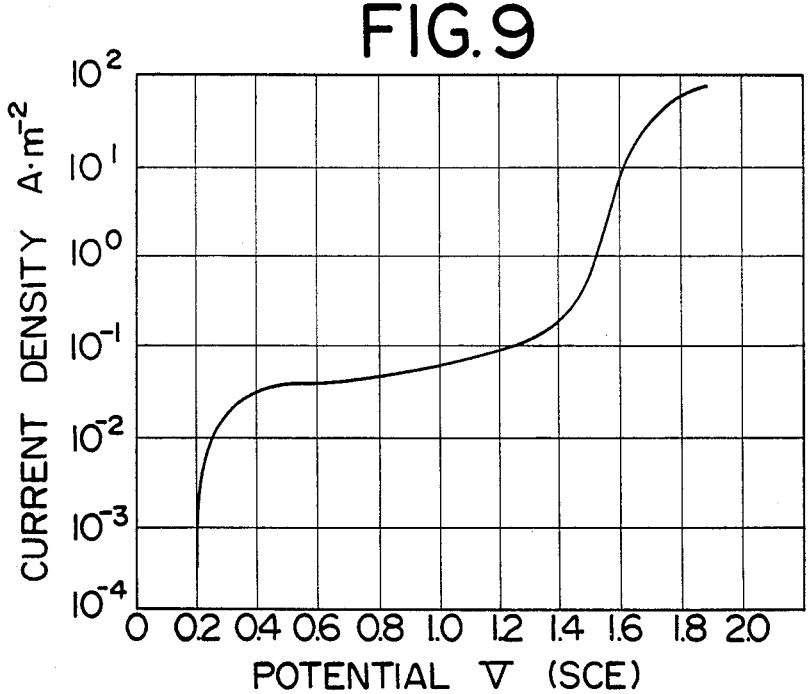

The surface alloy produced by laser irradiation was used to obtain the anodic polarization curve in 0.5N NaCl solution at 30° C., and the curve is shown in FIG. 9. The surface alloy and been spontaneously passivated, without showing any active state at all, and was passive over a wide range, indicating very high corrosion resistance. At high potentials, the current density rose due to chlorine evolution.

For further enhancement of the electrocatalytic activity for chlorine evolution, the surface activation treatment was carried out by immersion in 4.6% HF solution at room temperature for 90 seconds, until the surface turned to black due to surface roughening. The anodic polarization curve obtained in 0.5N NaCl solution at 30° C. was almost the same as that in Example 1, indicating that the surface alloy was highly active as an electrode.

From the above results, it can be seen that a surface activated surface alloy combining both high corrosion resistance and high electrocatalytic activity could be formed on a crystalline bulk alloy.

EXAMPLE 7

A 1 mm thick zirconium-niobiumk alloy sheet containing 12.5 at. % of niobium was plated with nickel, palladium and rhodium respectively by 8 $\mu$m, 0.42 $\mu$m and 0.2 $\mu$m in thickness, and plated sheet was heat-treated under vacuum and then quenched in a diffusion of elements from the alloy substrate into the plating layer and to the formation of tight bonding among the three plating layers and the alloy substrate. The sample was fixed on an X-Y table reciprocating in X direction and was irradiation with a continuous $CO_2$ laser beam of 500 W in output and 200 μm in beam diameter. The irradiation energy density was 833.3 J/cm$^2$, and the melting time was $6.67 \times 10^{-4}$ sec. After completion of each one-way motion in X direction, the sample was moved in Y direction by 50 μm for overlapped laser-treated surface. The treatment was repeated once again under said condition, to obtain a surface alloy with nickel-, zirconium-, niobium, palladium- and rhodium-homogeneously distributed mixture of crystalline and amorphous phases. The third irradiation treatment was made by moving the sample in Y direction by 75 μm after each one-way motion in X direction at an irradiation energy density of 833.3 J/cm$^2$ for a melting time was $6.67 \times 10^{-4}$ sec.

The third treatment produced a surface alloy partially containing amorphous phase and consisting of nickel, niobium and rhodium on the zirconium-niobium alloy substrate.

A partial section of the sample was cut out, and polished using silicon carbide paper and buff, to measure the average thickness of the surface alloy layer using an optical microscope and a scanning electron microscope. The average thickness was found to be 40 μm. Calculation made from the average thickness on the assumption that nickel, palladium and rhodium were not evaporated during the laser beam irradiation revealed that the surface alloy consisted of Ni-56.1 atom % Zr-8.0 atom % Nb-1.3 atom % Pd-0.7 atom % Rh. The values coincided with the results obtained by analyzing the surface alloy using an X-ray microanalyzer.

Figure 10:
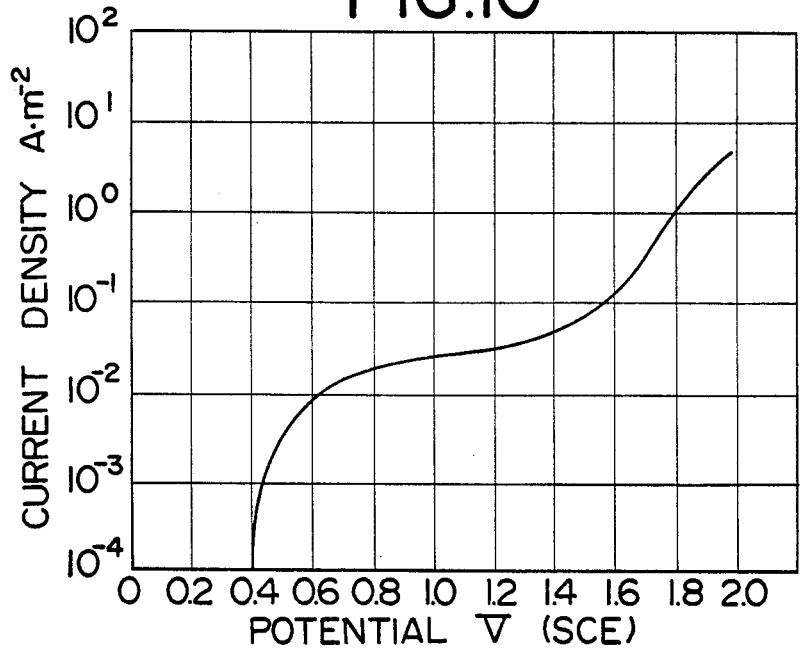

The surface alloy produced by laser irradiation was used to obtain the anodic polarization curve in 0.5N NaCl solution at 30° C., and the curve is shown in FIG. 10. The surface alloy had been spontaneously passivated, without showing any active state, and was passive over a wide range, indicating a very high corrosion resistance. At high potentials, the current density rose due to chlorine evolution.

For further enhancement of the electrocatalytic activity for chlorine evolution, the surface activation treatment was carried out by immersion in 4.6% HF solution at room temperature for 90 seconds, until the surface turned to black due to surface roughening. The anodic polarization curve obtained in 0.5N NaCl solution at 30° C. was almost the same as that in Example 1, indicating that the surface alloy was highly active as an electrode.

From the above results, it can be seen that a surface activated surface alloy combining both high corrosion resistance and high electrocatalytic activity could be formed on a crystalline bulk alloy.

EXAMPLE 8

A 1 mm thick zirconium-tantalum alloy sheet containing 12.5 at. % of tantalum was plated with nickel, palladium and rhodium respectively by 8 μm, 0.82 μm and 0.2 μm in thickness, and plated sheet was heat-treated under vacuum and then quenched in a diffusion pump oil in vacuo. This treatment led to diffusion of elements from the alloy substrate into the plating layer and to the formation of tight bonding among the three plating layers and the alloy substrate. The sample was fixed on an X-Y table reciprocating in X direction and was irradiation with a continuous $CO_2$ laser beam of 500 W in output and 200 μm in beam diameter. The irradiation energy density was 833.3 J/cm$^2$, and the melting time was $6.67 \times 10^{-4}$ sec. After completion of each one-way motion in X direction, the sample was moved in Y direction by 50 μm for overlapped laser irradiation to convert the entire surface to the laser-treated surface. The treatment was repeated once again, to obtain a surface alloy with nickel-, zirconium-, tantalum-, palladium- and rhodium-homogeneously distributed mixture of crystalline and amorphous phases. The third irradiation treatment was made by moving the sample in Y direction by 75 μm after each one-way motion in X direction at an irradiation energy density of 833.3 J/cm$^2$ for a melting time was $6.67 \times 10^{-4}$ sec. The third treatment produced a surface alloy layer partially containing amorphous phase and consisting of nickel, zirconium, tantalum, palladium and rhodium on the zirconium-tantalum alloy substrate.

A partial section of the sample was cut out, and polished using silicon carbide paper and buff, to measure the average thickness of the surface alloy layer using an optical microscope and a scanning electron microscope. The average thickness was found to be 35 μm. Calculation made from the average thickness on the assumption that nickel, palladium and rhodium were not evaporated during the laser beam irradiation treatment revealed that the surface alloy consisted on Ni-52.6 atom % Zr-7.5 atom % Ta-1.5 atom % Pd-0.7 atom % Rh. The values coincided with the results obtained by analyzing the surface alloy using an X-ray microanalyzer.

Figure 11:
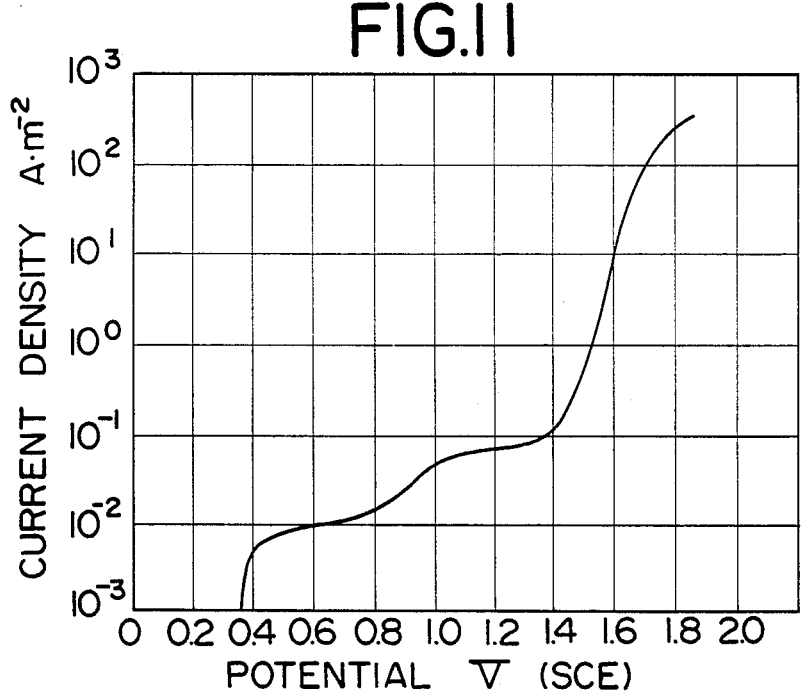

The surface alloy produced by laser irradiation was used to obtain the anodic polarization curve in 0.5N NaCl solution at 30° C., and the curve is shown in FIG. 11. The surface alloy had been spontaneously passivated, without showing any active state, and was passive over a wide range, indicating a very high corrosion resistance. At high potentials, the current density rose due to chlorine evolution.

For further enhancement of the electrocatalytic activity for chlorine evolution, the surface activation treatment was carried out by immersion in 4.6% HF solution at room temperature for 90 seconds, until the surface turned to black due to surface roughening. The anodic polarization curve obtained in 0.5N NaCl solution at 30° C. was almost the same as that in Example 1, indicating that the surface alloy was highly active as an electrode.

From the above results, it can be seen that a surface activated surface alloy combining both high corrosion resistance and high electrocatalytic activity could be formed on a crystalline bulk alloy.

EXAMPLE 9

A 1 mm thick titanium-niobium-tantalum alloy sheet containing 5 atom % of niobium and 5 atom % of tantalum was plated with nickel, palladium and rhodium respectively by 8 μm, 0.42 μm and 0.2 μm in thickness, and plated sheet was heat-treated under vacuum and then quenched in a diffusion pump oil in vacuo. This treatment led to diffusion of elements from the alloy substrate into the plating layer and to the formation of tight bonding among the three plating layers and the alloy substrate. The sample was fixed on an X-Y table reciprocating in X direction and was irradiation with a continuous $CO_2$ laser beam of 500 W in output and 200 μm in beam diameter. The irradiation energy density was 781.25 J/cm$^2$, and the melting time was $6.25 \times 10^{-4}$ sec. After completion of each one-way motion in X direction, the sample was moved in Y direction by 50 μm for overlapped laser irradiation to convert the entire surface to the laser-treated surface. The treatment was repeated once again, to obtain a surface alloy with nickel-, titanium-, niobium-, tantalum-, palladium- and rhodium-homogeneously distributed mixture of crystalline and amorphous phases. The third irradiation treatment was made by moving the sample in Y direction by 75 μm after each one-way motion in X direction at an irradiation energy density of 480.77 J/cm$^2$ for a melting time was $3.85 \times 10^{-4}$ sec. The third treatment produced a surface alloy layer containing amorphous phase and consisting of nickel, titanium, niobium, tantalum, palladium and rhodium on the titanium-niobium-tantalum alloy substrate.

A partial section of the sample was cut out, and polished using silicon carbide paper and buff, to measure the average thickness of the surface alloy layer using an optical microscope and a scanning electron microscope. The average thickness was found to be 35 μm. Calculation made from the average thickness on the assumption that nickel, palladium and rhodium were not evaporated during the laser beam irradiation treatment revealed that the surface alloy consisted of Ni-59.2 atom % Ti-3.3 atom % Nb-3.2 atom % Ta-1.3 atom % Pd-0.6 atom % Rh. The values coincided with the results obtained by analyzing the surface alloy using an X-ray microanalyzer.

Figure 12:
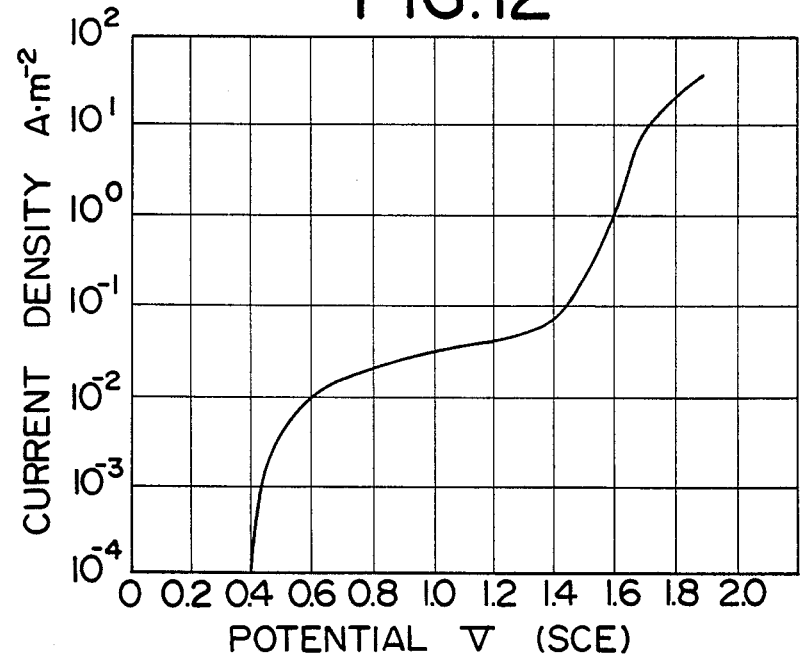

The surface alloy produced by laser irradiation was used, to obtain the anodic polarization curve in 0.5N NaCl at 30° C., and the curve is shown in FIG. 12. The surface alloy had been spontaneously passivated, without showing any active state, and was passive over a wide range, indicating a very high corrosion resistance. At high potentials, the current density rose due to chlorine evolution.

For further enhancement of the electrocatalytic activity for chlorine evolution, the surface activation treatment was carried out by immersion in 4.6% HF solution at room temperature for 90 seconds, until the surface turned to black due to surface roughening. The anodic polarization curve obtained in 0.5N NaCl solution at 30° C. was almost the same as that in Example 1, indicating that the surface alloy was highly active as an electrode.

From the above results, it can be seen that a surface activated surface alloy combining both high corrosion resistance and high electrocatalytic activity could be formed on a crystalline bulk alloy.

EXAMPLE 10

A 1 mm thick titanium-tantalum-niobium-zirconium alloy sheet containing 5 at. % of tantalum, 5 atom % of niobium and 5 atom % zirconium was plated with nickel, palladium and rhodium respectively by 8 μm, 0.42 μm and 0.2 μm in thickness, and plated sheet was heat-treated under vacuum and then quenced in a diffusion pump oil in vacuo. This treatment led to diffusion of elements from the alloy substrate into the plating layer and to the formation of tight bonding among the three plating layers and the alloy substrate. The sample was fixed on an X-Y table reciprocating in X direction and was irradiation with a continuous CO$_2$ laser beam of 500 W in output and 200 μm in beam diameter. The irradiation energy density was 781.25 J/cm$^2$, and the melting time was $6.25 \times 10^{-4}$ sec. After completion of each one-way motion in X direction, the sample was moved in Y direction by 50 μm for overlapped laser irradiation to convert the entire surface to the laser-treated surface. The treatment was repeated once again under said condition, to obtain a surface alloy with nickel-, titanium-, tantalum-, niobium-, zirconium-, palladium- and rhodium-homogeneously distributed mixture of crystalline and amorphous phases. The third irradiation treatment was made by moving the sample in Y direction by 75 μm after each one-way motion in X direction at an irradiation energy density of 480.77 J/cm$^2$ for a melting time was $3.85 \times 10^{-4}$ sec. The third treatment produced a surface alloy layer partially containing amorphous phase and consisting of nickel, titanium, tantalum, niobium, zirconium, palladium and rhodium on the titanium-tantalum-niobium-zirconium alloy substrate.

A partial section of the sample was cut out, and polished using silicon carbide paper and buff, to measure the average thickness of the surface alloy layer using an optical microscope and a scanning electron microscope. The average thickness was found to be 35 μm. Calculation made from the average thickness on the assumption that nickel, palladium and rhodium were not evaporated during the laser beam irradiation treatment revealed that the surface alloy consisted of Ni-55.7 atom % Ti-3.2 atom % Ta-3.2 atom % Nb-3.2 atom % Zr-1.3 atom % Pd-0.6 atom % Rh. The values coincided with the results obtained by analyzing the surface alloy using an X-ray microanalyzer.

Figure 13:
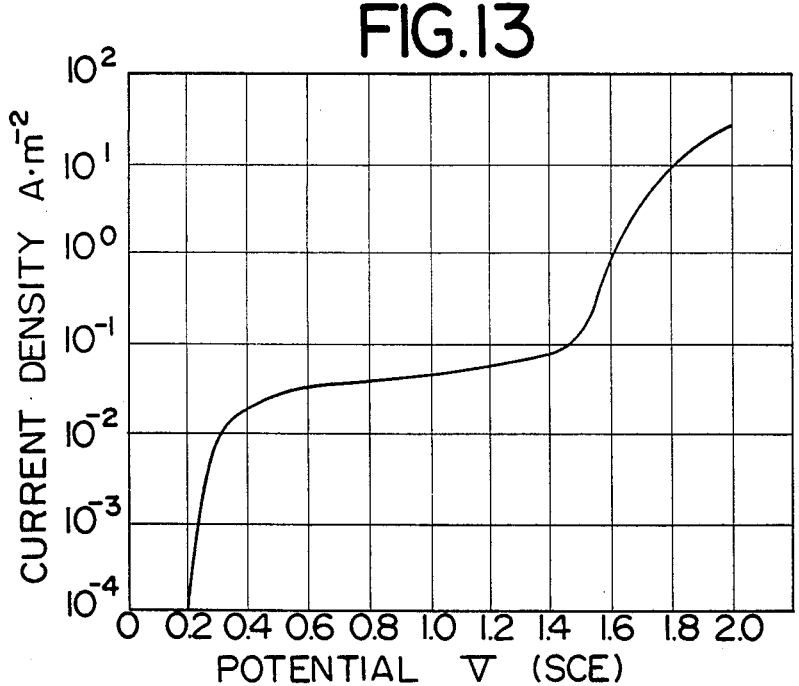

The surface alloy produced by laser irradiation was used, to obtain the anodic polarization curve in 0.5N NaCl solution at 30° C., and the curve is shown in FIG. 13. The surface alloy and been spontaneously, passivated, without showing any active state, and was passive over a wide range, indicating a very high corrosion resistance. At high potentials, the current density rose due to chlorine evolution.

For further enhancement of the electrocatalytic activity for chlorine evolution, the surface activation treatment was carried out by immersion in 4.6% HF solution at room temperature for 90 seconds, until the surface turned to black due to surface roughening. The anodic polarization curve obtained in 0.5N NaCl solution at 30° C. was almost the same as that in Example 1, indicating that the surface alloy was highly active as an electrode.

From the above results, it can be seen that a surface activated surface alloy combining both high corrosion resistance and high electrocatalytic activity could be formed on a crystalline bulk alloy.

EXAMPLE 11

A 1 mm thick niobium sheet was plated with nickel, cobalt, palladium and rhodium respectively by 9 μm, 9 μm, 0.8 μm and 0.5 μm in thickness, and plated sheet was heat-treated under vacuum and then quenced in a diffusion pump oil in vacuo. This treatment led to diffusion of niobium into the plating layer and to the formation of tight bonding among the four plating layers and the niobium substrate. The sample was fixed on an X-Y table reciprocating in X direction and was irradiation with a continuous CO$_2$ laser beam of 500 W in output and 200 μm in beam diameter. The irradiation energy density was 2,500 J/cm$^2$, and the melting time was $2 \times 10^{-3}$ sec. After completion of each one-way motion in X direction, the sample was moved in Y direction by 50 μm for overlapped laser irradiation to convert the entire surface to the laser-treated surface. The treatment was repeated once again, to obtain a surface alloy with nickel-, cobalt-, niobium-, palladium- and rhodium-homogeneously distributed mixture of crystalline and amorphous phases. The third irradiation treatment was made by moving the sample in Y direction by 75 μm after each one-way motion in X direction at an irradiation energy density of 781.25 J/cm$^2$ for a melting time was $6.25 \times 10^{-4}$ sec. The third treatment produced an amorphous surface alloy layer consisting of nickel, niobium, palladium and rhodium on the niobium substrate.

A partial section of the sample was cut out, and polished using silicon carbide paper and buff, to measure the average thickness of the amorphous surface alloy layer using an optical microscope and a scanning electron microscope. The average thickness was found to be 40 μm Calculation made from the average thickness on the assumption that nickel, palladium and rhodium were not evaporated during the laser beam irradiation treatment revealed that the amorphous surface alloy consisted of Ni-30 atom % Co-37 atom % Nb-2 atom % Pd-1 atom % Rh. The values coincided with the results obtained by analyzing the amorphous surface alloy using an X-ray microanalyzer.

Figure 14:
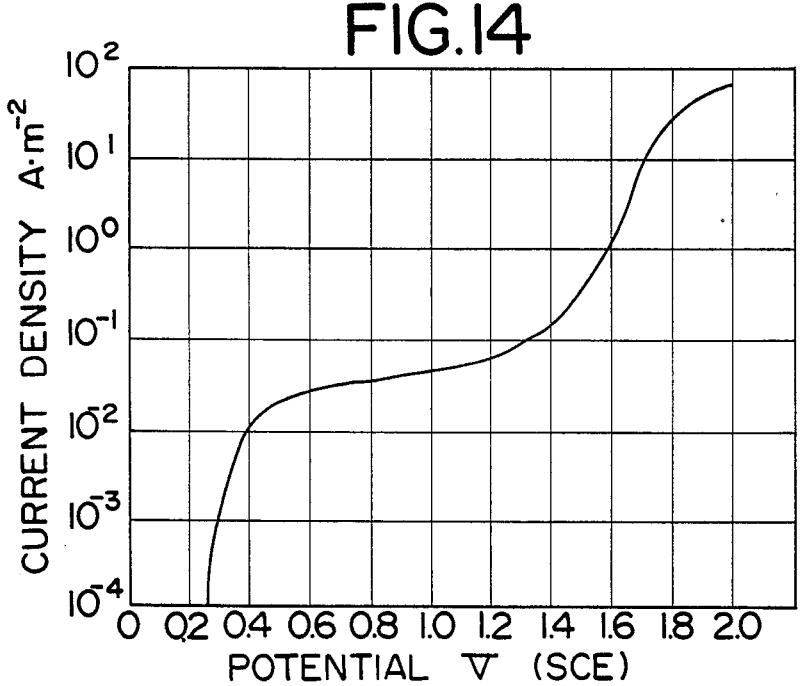

The amorphous surface alloy produced by laser irradiation was used, to obtain the anodic polarization curve in 0.5N NaCl solution at 30° C., and the curve is shown in FIG. 14. The amorphous surface alloy had been spontaneously passivated, without showing any active state, and was passive over a wide range, indicating a very high corrosion resistance. At high potentials, the current density rose due to chlorine generation.

For further enhancement of the electrocatalytic activity for chlorine evolution, the surface activation treatment was carried out by immersion in 4.6% HF solution at room temperature for 90 seconds, until the surface turned to black due to surface roughening. The anodic polarization curve obtained in 0.5N NaCl solution at 30° C. was almost the same as that in Example 1, indicating that the surface alloy was highly active as an electrode.

From the above results, it can be seen that a surface activated surface alloy combining both high corrosion resistance and high electrocatalytic activity could be formed on a crystalline bulk alloy.

EXAMPLE 12

A 1 mm thick niobium sheet was plated with nickel by 19 μm in thickness. On the other hand, chloroiridic acid and chloroplatinic acid were mixed at a ratio of iridium:platinum=1:3, and the mixture was made pasty by ethyl alcohol. The plated sheet was coated with the paste, dried at 50° C. for 10 minutes, and baked in nitrogen atomsphere at 500° C. for 10 minutes. The treatment was repeatedly made 3 times, to produce a 4 μm thick platinum-iridium alloy layer on the nickel plating. The coated sheet was heat-treated under vacuum and then quenched in diffusion pump oil in vacuo. The treatment led to the diffusion of niobium into the plating layer, and to the formation of tight bond among the two surface layers and the niobium substrate. The sample was fixed on an X-Y table reciprocating in X direction and was irradiation with a continuous CO$_2$ laser beam of 500 W in output and 200 μm in beam diameter. The irradiation energy density was 312.5 J/cm$^2$, and the melting time was $2.5 \times 10^{-3}$ sec. After completion of each one-way motion in X direction, the sample was moved in Y direction by 25 μm for overlapped laser irradiation to convert the entire surface to the laser-treated surface. The treatment was repeated once again, to obtain a surface alloy with nickel-, niobium-, platinum- and iridium-homogeneously distributed mixture of crystalline and amorphous plases. The third irradiation treatment was made by moving the sample in Y direction by 75 μm after each one-way motion in X direction at an irradiation energy density of 781.25 J/cm$^2$ for a melting time was $6.25 \times 10^{-4}$ sec. The third treatment produced an amorphous surface alloy layer consisting of nickel, niobium platinum and iridium on the niobium substrate.

A partial section of the sample was cut out, and polished using silicon carbide paper and buff, to measure the average thickness of the amorphous surface alloy layer using an optical microscope and a scanning electron microscope. The average thickness was found to be 45 μm Calculation made from the average thickness on the assumption that nickel, platinum and iridium were not evaporated during the laser beam irradiation revealed that the amorphous surface alloy consisted of Ni-38 atom % Nb-6 atom % Pd-2 atom % Ir. The values coincided with the results obtained by analyzing the amorphous surface alloy using an X-ray microanalyzer.

Figure 15:
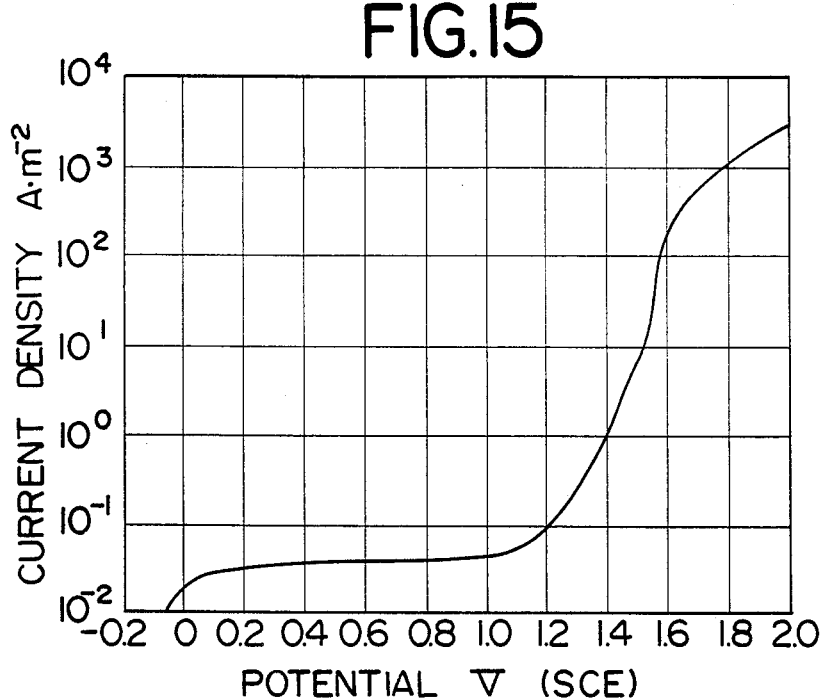

The amorphous surface alloy produced by laser irradiation was used, to obtain the anode polymerization curve in 0.5N NaCl solution at 30° C., and the curve is shown in FIG. 15. The amorphous surface alloy had been self-passivated, without showing any active state at all, and was passive over a wide range, to confirm very high corrosion resistance. At high potentials, the current density rose based on chlorine generation.

Figure 16:
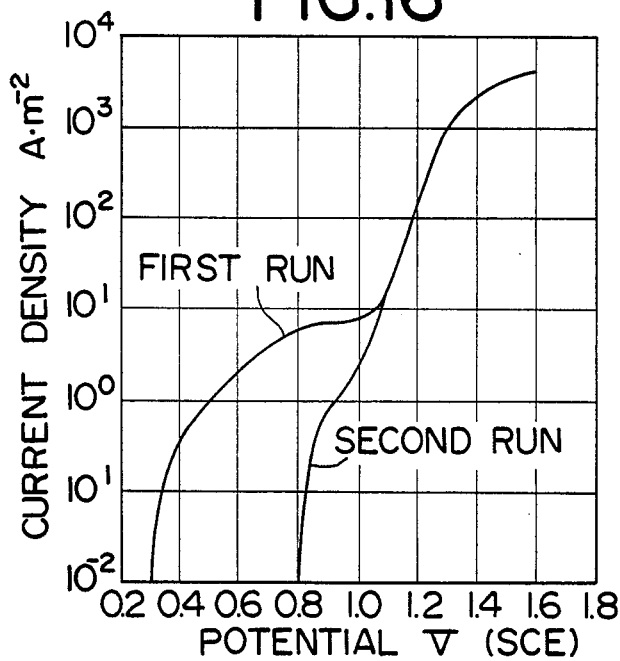

For further enhancement of the electrocatalytic activity for chlorine evolution, the surface activation treatment was carried out by immersion in 4.6 HF solution at room temperature for 90 seconds, until the surface turned to black due to surface roughening. The anodic polarization curve obtained in 0.5N NaCl solution at 30° C. is shown in FIG. 16. The polarization curve after the surface activation treatment shows the maximum dissolving current at about 0.6 V (SCE), at which the elements remaining undissolved in the surface activation treatment were dissolved from the surface layer. However, once polarization was performed at 1.0 V (SCE) or higher potentials, the second run of polarization measurement shows no active dissolution current indicating a high corrosion resistance due to spontaneously passivation. In the high potential region, the current based on chlorine evolution sharply rose. For example, the current density at 1.2 V (SCE) reached 15,000 times that before surface activation, and hence that the electrocatalytic activity was increased to 15,000 times by the surface activation treatment.

From the above results, it can be seen that a surface activated surface alloy combining both high corrosion resistance and high electrocatalytic activity could be formed on a crystalline metal.

As described above in detail, the surface activated surface alloy electrodes of the present invention display very high electrocatalytic activity in the electrolysis of aqueous solutions and are ideally conditioned electrodes composed of a surface activated alloy with a long life and an substrate with a predetermined thickness acting as a conductor with low electric resistance required for feeding current to the surface activated alloy. The surface activated surface alloy electrodes of the present invention are prepared by a process peculiar to the present invention, i.e. by preparing a surface alloy with predetermined properties on the surface of an ordinary metallic material and applying surface activation treatment to the surface alloy. Thus, the present invention process for preparing surface activated surface alloy electrodes does not require any complicated or expensive operation, and the surface activated surface alloy electrodes of the present invention thus obtained have an ideal structure. Both the electrodes and preparation process of the present invention are excellent in practicability.

We claim:

1. Surface activated surface alloy electrodes high in corrosion resistance and activity, comprising:
   A. a substrate selected from the group consisting of
      (i) a corrosion-resistant metal selected from titanium, zirconium, niobium and tantalum,
      (ii) a corrosion-resistant alloy composed of two or more metals selected from titanium, zirconium, niobium and tantalum, and
      (iii) (i) or (ii) clad with a corrosion-resistant metal or a corrosion-resistant-alloy, and
   B. a solid surface alloy layer on substrate A, said solid surface alloy consisting of 20 to 67 atomic % of one or more metals selected from titanium, zirconium, niobium and tantalum, 0.01 to 10 atomic % of one or more platinum group metals of ruthenium, rhodium, palladium, iridium and platinum, and substantially the remaining amount of nickel and/or cobalt, and said solid surface alloy containing an amorphous phase of 150 μm or less thickness as a result of being formed by irradiation melting of high energy density beam followed by self quenching; the surface of said solid surface alloy being activated by surface roughening and enrichment of platinum group elements as a result of immersion in corrosive solution capable of dissolving nickel, cobalt, titanium, zirconium, niobium and tantalum selectively.

2. Surface activated surface alloy electrodes according to claim 1 wherein the corrosion-resistant substrate (i) or (ii) is clad with a metal selected from the group consisting of titanium, zirconium, niobium and tantalum.

3. Surface activated surface alloy electrodes according to claim 1 wherein the corrosion-resistant substrate (i) or (ii) is clad with a metal alloy selected from the group consisting of titanium, zirconium, niobium and tantalum.

* * * * *